Aug. 30, 1949.　　　　　W. J. BRETH　　　　　2,480,704
SERVICER FOR TIRE BUILDING MACHINES
Filed Feb. 5, 1947　　　　　　　　　　　　5 Sheets-Sheet 1

INVENTOR
Walter J. Breth
BY
Evans & McCoy
ATTORNEYS

Aug. 30, 1949.  W. J. BRETH  2,480,704
SERVICER FOR TIRE BUILDING MACHINES
Filed Feb. 5, 1947  5 Sheets-Sheet 5

INVENTOR
*Walter J. Breth*
BY
*Evans + McCoy*
ATTORNEYS

Patented Aug. 30, 1949

2,480,704

UNITED STATES PATENT OFFICE 2,480,704

SERVICER FOR TIRE BUILDING MACHINES

Walter J. Breth, Akron, Ohio, assignor to The General Tire and Rubber Company, Akron, Ohio, a corporation of Ohio Application February 5, 1947, Serial No. 726,611

6 Claims. (Cl. 154—10)

This invention relates to devices for supplying fabric to tire building machines and more particularly to a device which automatically maintains a predetermined amount of fabric in position to be delivered to a tire building machine.

The invention has for its object to provide a fabric supplying device of simple and inexpensive construction which facilitates the application of fabric plies to a tire carcass being built upon a drum.

Fabric used in tire building is composed of bias cut pieces joined end to end to form strips that are fed to the tire building machine. It is important, particularly in feeding narrow strips of fabric such as breaker and chaffer strips, to avoid the application of tension to the strips during their delivery to and application to the tire building drum, since a pull on the strips tends to stretch the fabric. In the case of cord fabric such as used for breaker strips, the stretching increases the space between the cords and in the case of square woven fabric such as used for chaffer strips, the strip is narrowed by stretching.

An important object of the present invention is to provide fabric supplying means in which the fabric is subjected to very little tension so that stretching of the fabric is avoided.

A further object of the invention is to provide a device for supplying a plurality of fabric strips simultaneously to a drum in such manner that each strip is freely movable independently of the others, thereby avoiding the application of unequal tensions to the strips as they are being wound upon the drum.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
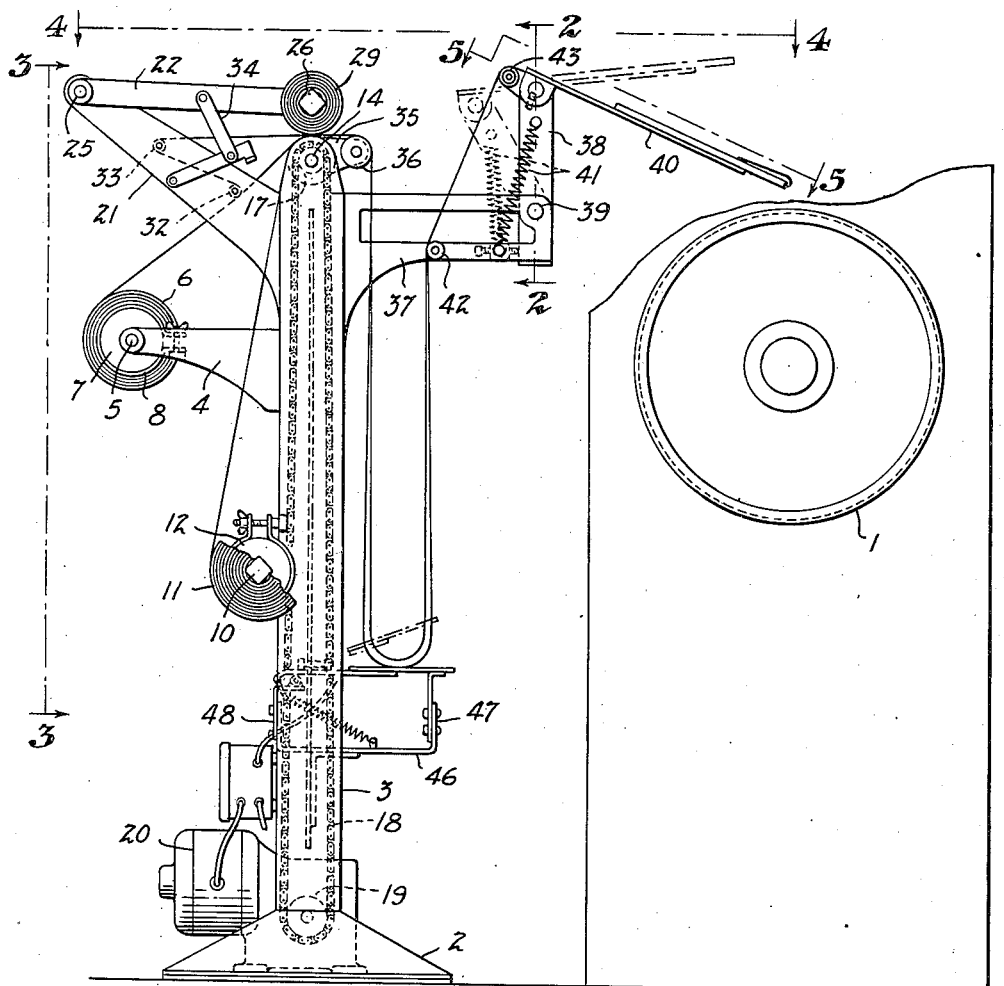
Figure 1 is a side elevation of a fabric supply device embodying the invention positioned adjacent to a tire building drum to which the fabric is to be supplied.
Figure 2:
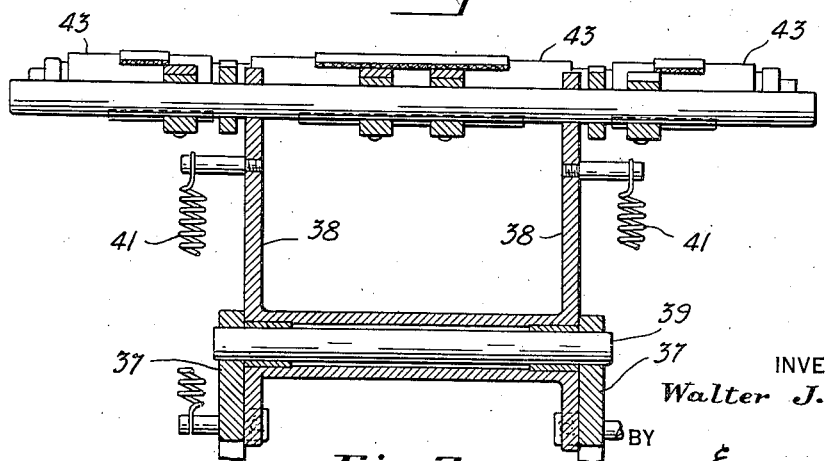
Fig. 2 is a vertical section taken on the line indicated at 2—2 in Fig. 1.
Figure 3:
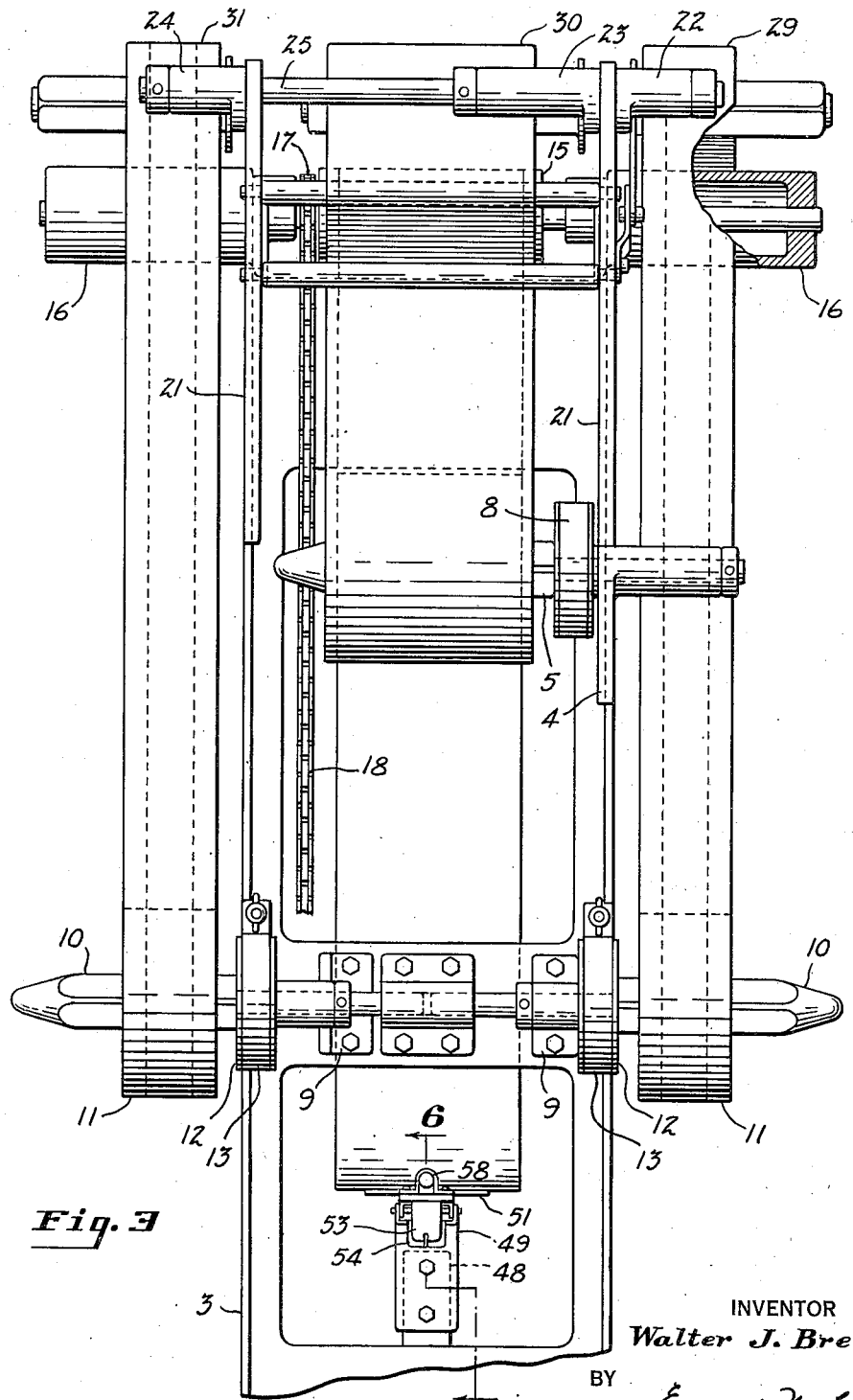
Fig. 3 is a partial rear elevation of the machine viewed as indicated by the arrows 3—3 in Fig. 1.

The device of the present invention is designed to service a conventional tire building machine, the drum 1 of which is shown in Fig. 1 of the drawing. The fabric supply device of the present invention is mounted at the rear of the tire building drum 1 and has a frame comprising a base 2 and a vertical standard 3 carried by the base. The standard 3 has a bracket 4 projecting rearwardly therefrom which supports a horizontal shaft 5 which provides a support for a fabric reel 6, the shaft 5 being provided with a drum 7 which is engaged by an adjustable friction band 8 which slightly retards the rotation of the fabric reel so as to insure uniformity of feed.

Below the bracket 4 and at opposite sides thereof, the standard 3 has brackets 9 which support shafts 10 upon which fabric reels 11 may be detachably mounted. The shafts 10 have drums 12 engaged by adjustable friction bands 13. A horizontal shaft 14 is carried by the standard 3 at its upper end and this shaft carries a center roller 15 that is in alinement with the reel 6 and rollers 16 on opposite sides of the roller 15 which are alined with the reels 11, the rollers 15 and 16 being rotatable with the shaft 14. The shaft 14 has a sprocket 17 that receives an endless sprocket chain 18 that extends from the top of the standard 3 to a sprocket 19 mounted on the base 2. The sprocket 19 is driven through suitable reduction gearing from a motor 20. Fabric from the reels 6 and 11 passes over the rollers 15 and 16 and is advanced by the rotation of these rollers.

The standard 3 has rigid rearwardly projecting arms 21 adjacent its upper end to which forwardly extending arms 22, 23 and 24 are pivoted at their rear ends by means of a shaft 25. The arms 22, 23 and 24 carry short horizontal shafts 26, 27 and 28 which are adapted to receive liner reels 29, 30 and 31 upon which the liners, with which the tire fabric is wrapped on the reels 6 and 11, are wound. The reels 29, 30 and 31 are positioned directly over the rollers 15 and 16 and are supported thereon by gravity, the fabric wound on the reels 29, 30 and 31 bearing against the tire fabric on the rollers 15 and 16 so that the liner windup reels are frictionally driven at a peripheral speed equal to that of the fabric to uniformly wind the liners. The arms 22, 23 and 24 are adapted to be supported by suitable toggles 34 in a position clear of the fabric feed rollers 15 and 16 to facilitate the removal of full reels from the shafts 26, 27 and 28 and the mounting of empty reels thereon.

Short arms 35 project forwardly from the upper end of the standard 3 and these arms support idler rollers 36 which are alined with the rollers 15 and 16. Below the rollers 36 a forwardly projecting bracket 37 is attached to the standard 3 and this bracket carries a pivoted standard 38 at its forward end which is connected to the bracket by means of a pivot shaft 39. The standard 38 carries a feed table 40 which is adapted to support the ends of the fabric strips that have been fed by the driven rollers 15 and 16 in a position where they are conveniently accessible to a tire builder who is building a tire carcass on the drum 1. The standard 38 is normally held in a position such that the table 40 is elevated above the drum 1 and is yieldingly held by a spring 41 in this position. When the operator desires to apply the fabric strips to the drum he can pull the table 40 forwardly to a position closely overlying the drum and apply the strips to the tire carcass so that upon rotation of the drum the strips will be drawn over the table 40 to the drum.

Figure 4:
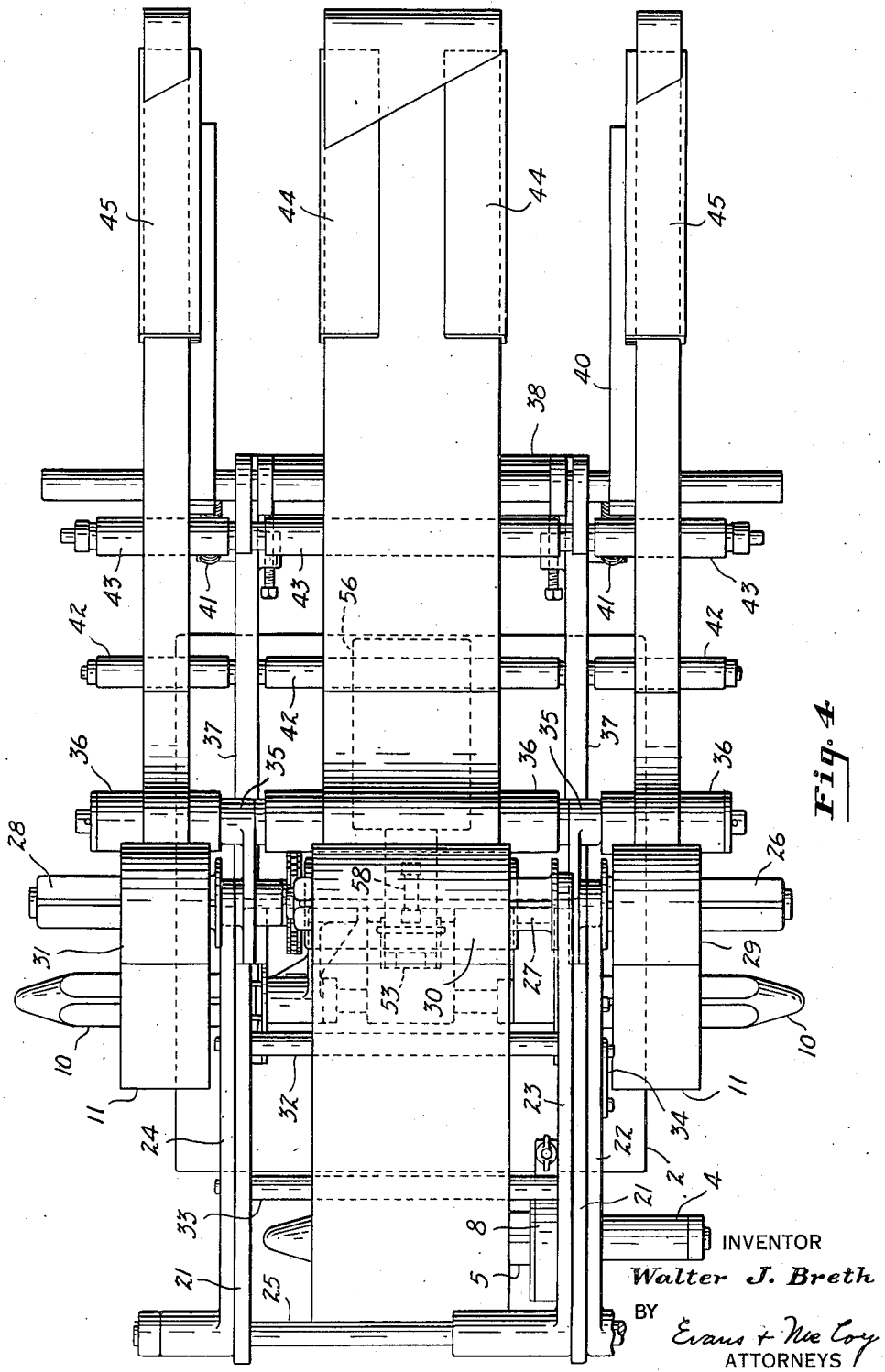
Fig. 4 is a top plan view of the machine.
Figure 5:
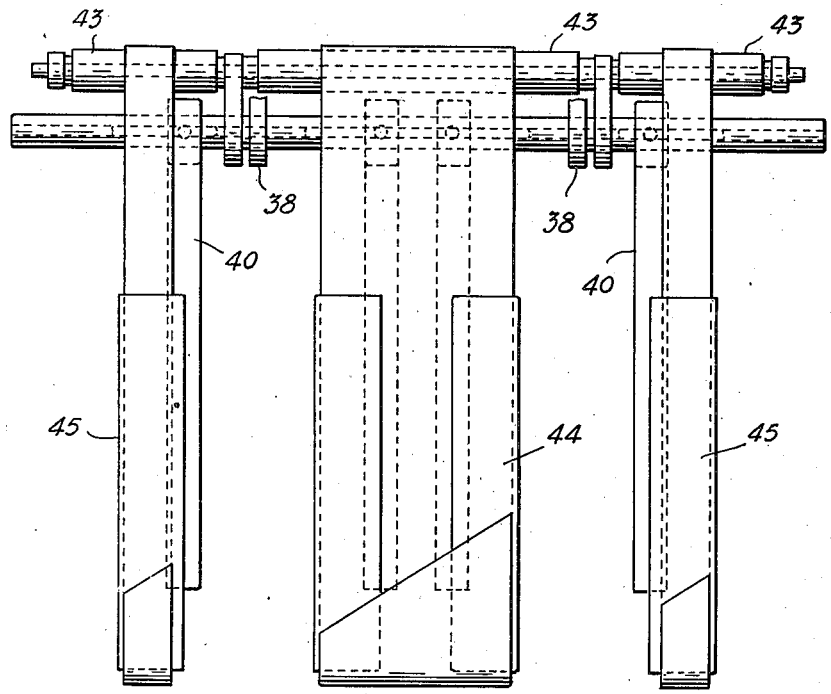
Fig. 5 is a top plan view of the fabric delivery table viewed as indicated by the arrows 5—5 in Fig. 1.
Figure 6:
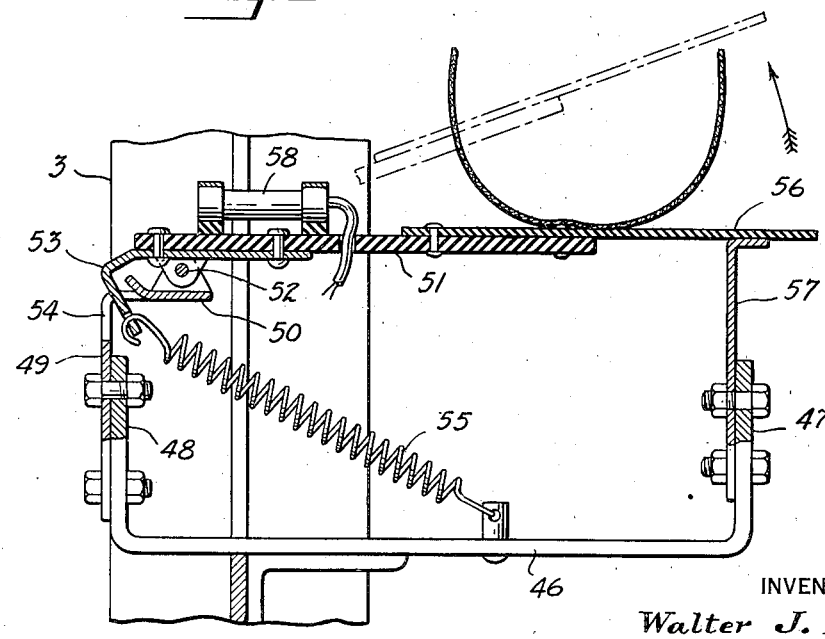
Fig. 6 is a vertical section through the drive control device taken on the line indicated at 6—6 in Fig. 3.

The bracket 37 carries axially alined guide rollers 42 which are spaced forwardly of the rollers 36 so that free hanging festoons of fabric may be supported in front of the standard 3. Axially alined guide rollers 43 are provided at the rear end of the table 40 and the table 40 is provided with suitable guide flanges 44 and 45 that overlie the center and side strips which are fed over the table to the drum. The center strip may be a breaker strip and the side strips may be chaffer strips. During intervals between the application of the fabric to the drum, the fabric will accumulate in independently movable festoons suspended from the rollers 36 and 42 in front of the standard 3. The speed of operation of the rollers 15 and 16 is such that sufficient material for the breaker and chaffer strips of a tire will accumulate in the free festoons during the interval between the application of the strips to successive tire carcasses. The free ends of the tacky fabric strips may be secured by turning them back upon the top faces of the flanges 44 and 45 as shown in Figs. 4 and 5.

In order to prevent an excess accumulation of fabric, means is provided for automatically stopping the motor when a predetermined amount of fabric has been fed to the festoons. The control of the device of the present invention is adapted to be operated by the weight of one of the festoons and includes a control member positioned directly beneath one of the festoons. The drive control device is mounted upon a bracket 46 attached to the standard 3 and having front and rear upwardly extending arms 47 and 48. The rear arm 48 has an angle plate 49 attached thereto which has a forwardly extending flange 50 to which a control plate 51 is connected by means of a pivot 52. The plate 51 has a bent arm 53 projecting from its rear edge and extending through a slot 54 in the plate 49. A spring 55 is attached at one end to the arm 53 and at the other end to the bracket 46, to normally hold the plate 51 in an inclined position. The plate 51 has a spring metal stop arm 56 attached thereto and projecting past its forward edge, and this stop arm engages with a stop member 57 attached to the forward arm 47 of the bracket, the stop member 57 being so positioned as to be engaged by the arm 56 when the plate 51 is in substantially horizontal position.

The plate 51 carries a mercury switch 58 which controls the motor 20, the switch 58 being closed and energizing the motor 20 when the plate 51 is in its elevated inclined position. The plate 51 is positioned directly beneath one of the fabric festoons, preferably the center festoon, and is moved downwardly in opposition to the spring 55 as the weight of the fabric is imposed thereon by the operation of the rollers 15 and 16 feeding fabric to the festoon. The stop plate 51 is positioned at a distance below the rollers 36 such that the amount of fabric in the festoon will be enough to supply the length of fabric required for one tire casing, so that the fabric may be drawn from the festoons to the tire building drum upon rotation of the drum after the operator has applied the strip ends to fabric on the drum.

By reason of the fact that the fabric is suspended in free festoons, very little tension is applied to the fabric in its passage from the feed rollers 15 and 16 to the tire building drum and distortion of the fabric due to stretching is avoided. Also by reason of the fact that the festoons are movable independently of one another, there is no inequality in tension during the winding of the fabric strips on the drum.

Figure 7:
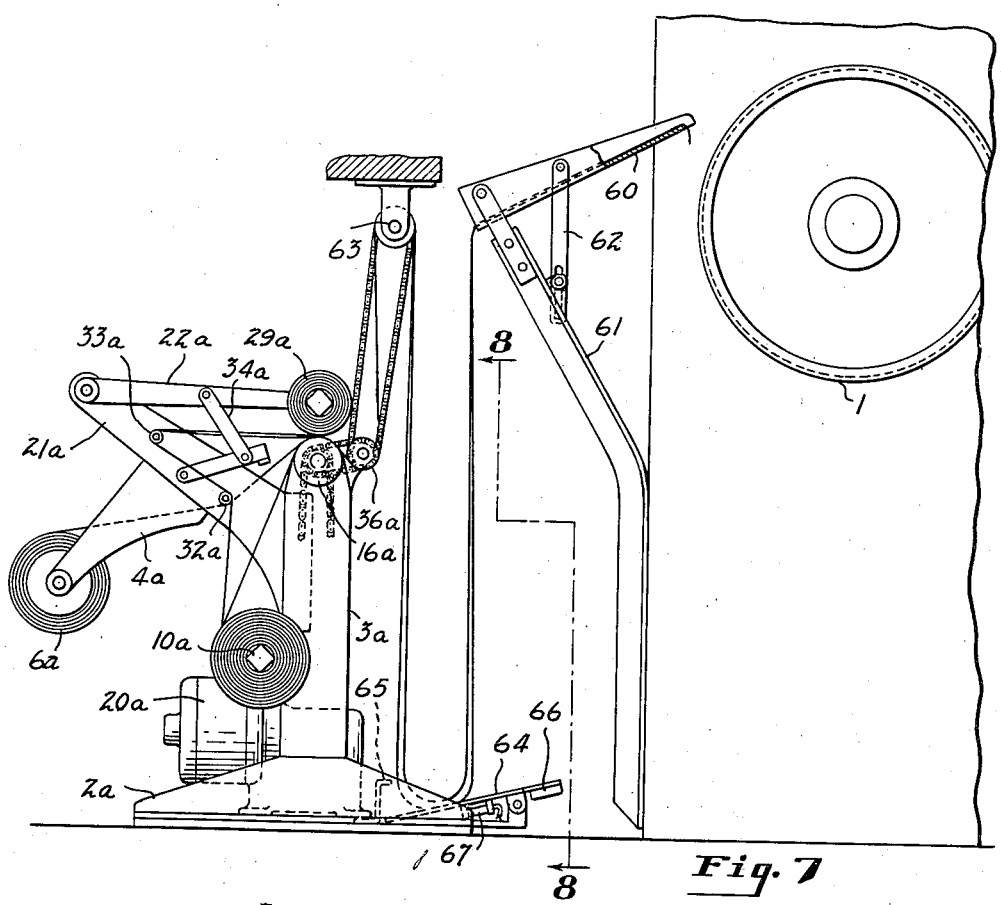
Fig. 7 is a side elevation showing a modified construction embodying the invention.
Figure 8:
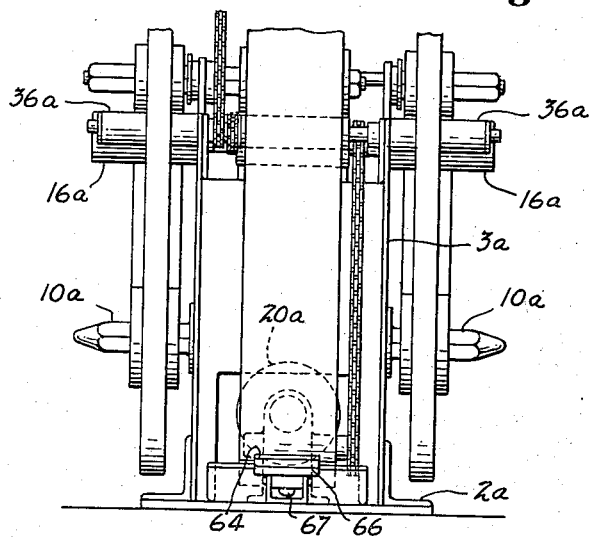
Fig. 8 is a rear elevation of the machine shown in Fig. 7.

In Figs. 7 and 8 of the drawing a slightly modified form of the invention is illustrated. In this device a feed table 60 is mounted in an upwardly inclined position at the rear of the drum 1 and this feed table may be supported from the frame of the tire building machine by a suitable bracket 61. The table 60 is preferably adjustable by suitable means such as an adjustable brace 62.

The fabric feed mechanism is similar to that previously disclosed except that a relatively short standard is employed. The parts numbered from 2 to 34 in Figs. 1 to 5 of the drawings are employed without substantial change in the modification shown in Figs. 7 and 8 and these parts are indicated by the same reference numerals with the letter a added.

The fabric fed by the driven rollers 15a and 16a passes under guide rollers 36a and over a fixed guide roller 63 positioned above the top of the standard. The fabric strips are supported in free hanging festoons between the rollers 63 and the feed table 60 in a manner similar to the festoons in the modification first described. A control plate 64 is mounted beneath one of the festoons and this plate is connected to the base 2a to swing vertically. A counterweight 66 attached to the plate 64 normally holds the plate against the under side of a stop 65 which is so positioned as to normally hold the plate 64 in a horizontal position. When the plate 64 is subjected to the weight of the fabric of the overlying festoon, it is moved downwardly to an inclined position. The plate 64 carries a motor controlling mercury switch 67 which serves to stop the motor when the plate 64 is depressed.

It is to be understood that variations and modifications of the specific device herein shown and described for purposes of illustration, may be made without departing from the spirit of the invention.

What I claim is:

1. A fabric delivering device for servicing tire building machines comprising a frame having means for supporting a plurality of rolls of bias cut tire fabric, a horizontal shaft on said frame having a plurality of rollers side by side thereon over which the fabric strips pass, a delivery table adapted to support ends of the fabric strip passed over said rollers, said table being spaced from said rollers whereby the fabric strips may hang in independent festoons side by side between said rollers and said table, means for driving said shaft, and means positioned in the path of one of said festoons only for controlling said driving means.

2. A fabric delivering device for servicing tire building machines comprises a frame having means for supporting a plurality of rolls of bias cut tire fabric, a horizontal shaft on said frame having a plurality of rollers side by side thereon over which the fabric strips pass, a delivery table adapted to support ends of the fabric strip passed over said rollers, said table being spaced from said rollers whereby the fabric strips may hang in independent festoons side by side between said rollers and said table, means for driving said shaft, a yieldably supported movable plate positioned beneath one of the festoons and adapted to be moved by the weight of fabric imposed thereon, and means operated by said plate for controlling the operation of said driving means.

3. A fabric delivering device for servicing tire building machines comprising a frame having means for supporting a plurality of rolls of bias cut tire fabric, a horizontal shaft on said frame having a plurality of rollers side by side thereon over which the fabric strips pass, a delivery table adapted to support ends of the fabric strip passed over said rollers, said table being spaced from said rollers whereby the fabric strips may hang in independent festoons side by side between said rollers and said table, an electric motor for driving said shaft, a plate beneath one of said festoons pivoted to swing about a horizontal axis, yieldable means for normally holding said plate in a horizontal position and permitting downward movement thereof under the weight of fabric resting thereon, and a switch operated by said plate to stop the motor when the plate is depressed and to start the same when the plate is returned to normal position.

4. A fabric delivering device for servicing tire building machines comprising a frame having a base and a standard, a horizontal shaft supported at the top of the standard, a plurality of rollers mounted side by side on said shaft, a plurality of supports for fabric reels on said standard each positioned in alinement with one of said rollers, a rearwardly extending arm secured to the standard adjacent its upper end, arms pivoted at their rear ends to said rearwardly extending arms and having means at their free ends for rotatably supporting liner wind-up reels in positions to rest on said rollers in frictional engagement therewith, means including a motor mounted on said base for driving said shaft, a delivery table spaced from said rollers to permit fabric to accumulate in festoons between the rollers and said table, and means for supporting said pivoted arms in an elevated position with said reels out of engagement with said rollers.

5. A fabric delivering device for servicing tire building machines comprising a frame having a base and a standard, a horizontal shaft supported at the top of the standard, a plurality of rollers mounted side by side on said shaft, a plurality of supports for fabric reels on said standard each positioned in alinement with one of said rollers, a rearwardly extending arm secured to the standard adjacent its upper end, arms pivoted at their rear ends to said rearwardly extending arms and having means at their free ends for rotatably supporting liner wind-up reels in positions to rest upon said rollers in frictional engagement therewith, means for supportng said arms in an elevated position with said reels clear of said rollers, a motor mounted on said base, and a driving connection from said motor to said shaft.

6. A fabric delivering device for servicing tire building machines comprising a frame having means for rotatably supporting a roll of bias cut cord fabric, a roller over which said fabric passes, a delivery table adapted to support an end of the fabric passed over said roll in a position accessible to the operator of a tire building machine, said table being spaced from said roller to allow the fabric to hang in a festoon between said roller and table, means for driving said roller to deliver fabric to said festoon, and means for controlling said driving means comprising a flat plate beneath said festoon and pivoted to swing about an axis parallel to said roller and disposed laterally of said festoon, yieldable means exerting a thrust on said plate tending to swing the same upwardly, a stop limiting the upward movement of said plate and positioning the plate beneath the festoon, whereby the lower end of the festoon will rest upon the plate, upon an increase in the length and the weight of the fabric said festoon will move said plate downwardly, and means operated by said plate and acting upon said driving means to stop said roller when the plate is depressed by the fabric and to start said roller when said plate is relieved of the weight of the fabric.

WALTER J. BRETH.

REFERENCES CITED

The following references are of record in the file of this patent:

UNITED STATES PATENTS

| Number | Name | Date |
| --- | --- | --- |
| 1,064,035 | Whalen | June 10, 1913 |
| 1,616,363 | Gammeter | Feb. 1, 1927 |
| 1,624,223 | Eakin | Apr. 12, 1927 |
| 1,876,761 | Rosener | Sept. 13, 1932 |
| 2,051,781 | Brown | Aug. 18, 1936 |
| 2,277,514 | Elser | Mar. 24, 1942 |
| 2,289,933 | Rankin | July 14, 1942 |
| 2,313,035 | Breth | Mar. 9, 1943 |
| 2,441,791 | Bostwick | May 18, 1948 |